Dec. 31, 1963 G. V. MORRIS 3,116,368

REMOTE CONTROL APPARATUS

Filed Nov. 9, 1960 3 Sheets-Sheet 1

INVENTOR.
George V. Morris

BY John J. Pederson
Atty.

INVENTOR.
George V. Morris
BY John J. Pederson
Atty.

INVENTOR.
George V. Morris
BY John J. Pederson
Atty.

3,116,368
REMOTE CONTROL APPARATUS
George V. Morris, Norridge, Ill., assignor to Zenith Radio Corporation, a corporation of Delaware
Filed Nov. 9, 1960, Ser. No. 68,215
9 Claims. (Cl. 179—1)

This invention relates to intelligence-reproducing apparatus such as radio and television receivers, phonographs and the like, and more particularly to such apparatus equipped for remote control.

The use of a remote control system for controlling the several operating characteristics of an intelligence-reproducing device such as a television receiver is now a common practice in the art. The remote control system greatly enhances the convenience of operation of the device. For example, in the case of a television receiver, the user may tune to different channels, change volume, and perform many other functions from the convenience of his armchair. Adjustment of the audio volume level is one of the more complex functions to be controlled by the remote control system. The ideal volume control would give the user the ability to turn on the set; establish a nominal setting of volume while the set warms up so that when audio starts it can be heard; effect substantially step-less controlled increase in volume; provide instantaneous muting of audio from any volume setting; and operate the on-off switch of the television receiver. However, as the number of controlled operating characteristics increases, the number of control channels in the remote control system is correspondingly increased, with an attendant increase in system cost and complexity. To provide enough control channels for independently controlling all of the above-named desirable volume control operating characteristics would obviously be possible only in a system so costly as to be commercially impractical. Consequently, prior remote control systems for television have combined other control functions such as on-off or mute with volume control, but no commercial practical prior system achieves all of the desiderata set forth above. For example, continuous volume controls utilizing two control channels have been constructed which turn the television receiver on and off and increase and decrease volume continuously, but the operating characteristic of instantaneous muting of the audio volume has been sacrificed. Other devices have been used which utilize only one control channel and provide "on-off" and a step increase in volume only; here both instantaneous mute and continuous volume control are sacrificed.

Accordingly, it is a principal object of this invention to provide a new and improved intelligence-reproducing apparatus adapted for remote control.

It is another object of this invention to provide a commercially practical remote control system in which remote volume control is achieved with greatly increased versatility and with an economical number of control channels.

The present invention provides a remote control apparatus comprising a control device including an adjustable element having a reference position and a plurality of additional operating positions for controlling an operating characteristic of such apparatus. Electrically operated driving means are coupled to the control device for varying the adjustable element between its operating positions. Control-signal-responsive means are provided for energizing and de-energizing the driving means at will. Means independent of the driving means directly reset the adjustable element to its reference position from any of its additional operating positions. Finally, control signal responsive means are provided for actuating the resetting means.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

Figure 1:
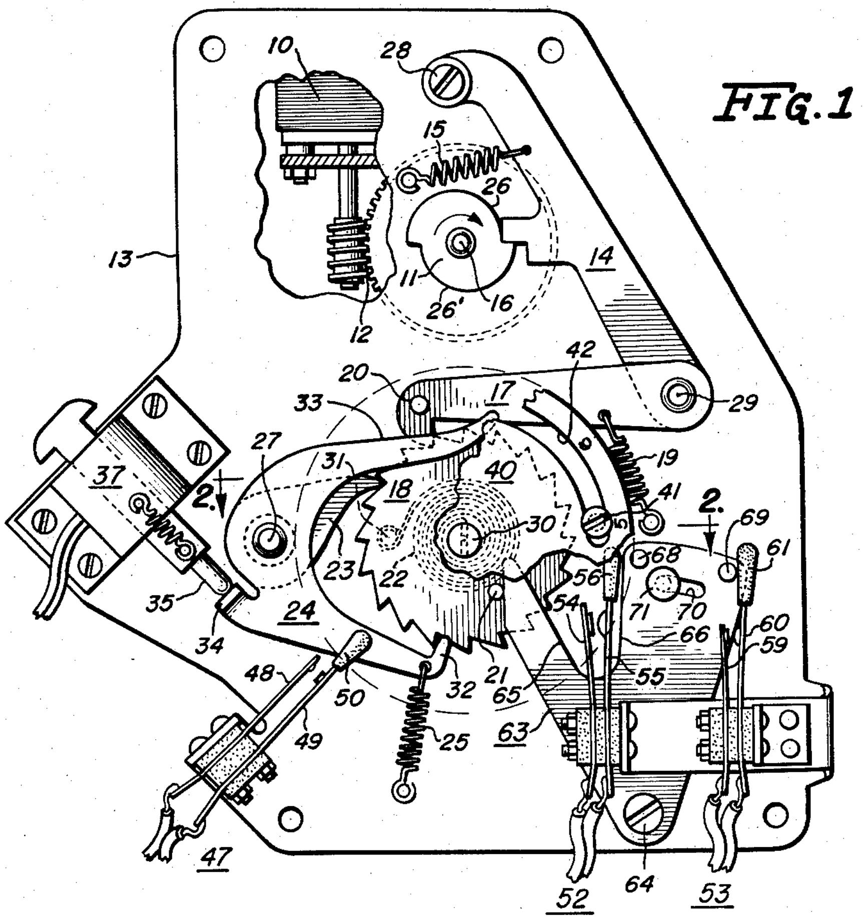
FIGURE 1 is an elevational view, partly in section, of a switching device employed in a preferred embodiment of the invention.

In FIGURE 1, a driving motor 10 is coupled to a cam 11 by a worm gear arrangement 12 which reduces the rotational speed of cam 11 in comparison to motor 10. Cam 11 is mounted on a shaft 16 supported for rotation in a supporting plate 13 and includes two offset semi-circular cam surfaces 26 and 26′ which engage a reciprocating lever 14, the clockwise rotary motion of cam 11 being translated by cam surfaces 26 and 26′ to a reciprocating motion of lever 14. Lever 14 is pivoted on a pin 28 which is fixed to plate 13 and is held against cam 11 by a tension spring 15. Reciprocating lever 14 is pivotally coupled by a pin 29 to a ratchet arm 17 having an upwardly projecting stud 20 and which is held against the teeth of a ratchet wheel 18 by a tension spring 19. Ratchet wheel 18 is mounted on a shaft 30 supported for rotation in plate 13, and includes an upwardly projecting stud 21 fixed on the face of wheel 18, and is biased by a helical spring 22 (shown in dashed outline) against rotation in a clockwise direction. A pawl 23 is rigidly coupled to a rocker arm 24 which is connected to a tension spring 25 biasing rocker arm 24 and pawl 23 in a clockwise direction and forcing pawl 23 against the teeth of ratchet wheel 18 thereby impeding counter-clockwise rotation of the ratchet wheel. Rocker arm 24 is pivotally mounted on a shaft 27 mounted for rotation in supporting plate 13 and includes a hook-shaped extension 32 on one end adapted for engagement with stud 21 of ratchet wheel 18 (see FIG. 2), an extension 33 adapted for engagement with stud 20 of ratchet arm 17, and a bearing surface 34 which is in physical contact with a plunger 35 of a solenoid 37. Actuation of solenoid 37 forces plunger 35 against bearing surface 34 causing a counter-clockwise movement of rocker arm 24 and pawl 23; pawl 23 is thus disengaged from ratchet wheel 18 and extension arm 33 intersects stud 20 moving arm 17 out of engagement with the teeth of ratchet wheel 18. The relation between hook-shaped extension 32 and stud 21 will be discussed later.

Figure 2:
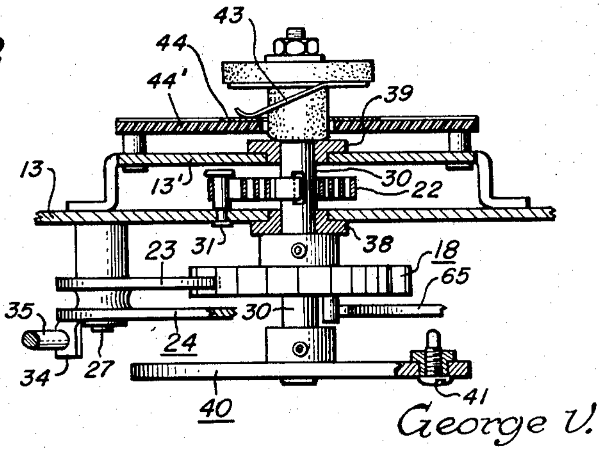
FIGURE 2 is a partial sectional view taken substantially along line 2—2 of FIGURE 1.

Referring to FIGURE 2 which discloses some aspects of the device of FIGURE 1 more clearly, ratchet wheel 18 is mounted on shaft 30 which is seated in bearings 38 and 39 mounted on plate 13 and a plate extension 13′ respectively. Spring 22 has one end fixed to shaft 30 and the other is fixed to supporting plate 13 by a pin 31. A disc 40 is mounted on the forward end of shaft 30 and includes an arcuate slot 42 (see FIGURE 1) in which is mounted an adjustable stud 41. At the other end of shaft 30 a movable contact or switch arm 43 is provided which engages a resistance 44 printed on an insulating board 44′.

Also mounted on supporting plate 13 is a switch 47 (shown in FIGURE 1) which includes normally open flexible contacts or switch arms 48 and 49. Contact 49 includes a tip portion 50 adapted for engagement with stud 41 or disc 40 and is engaged by stud 41 during rotation of ratchet wheel 18 (see FIGURE 4) to close switch 47. Switches 52 and 53 (see FIGURE 1) are also mounted on supporting plate 13. Switch 52 includes normally open flexible contacts or switch arms 54 and 55, contact 55 including a tip portion 56. Switch 53 includes normally closed flexible contacts or switch arms 59 and 60, switch arm 60 including a tip portion 61. A plate 63 is pivotally mounted on plate 13 by a pin 64 and includes a projection 65 adapted for engagement with stud 21 of ratchet wheel 18 as best shown in FIGURE 2 and a projection 66 which includes upwardly projecting studs 68 and 69 adapted for engagement with tip portions 56 and 61 respectively. The pivotal motion of plate 63 is limited by a slot 70 in the plate and a pin 71 which is fixed to plate 13 and extends through slot 70. Before the clockwise rotation of plate 63 is limited by pin 71, as shown in FIGURE 1, stud 69 engages end portion 61, thus disengaging switch 60 from contact with switch arm 59; before the counter-clockwise rotation of plate 63 is limited by pin 71, stud 68 engages end portion 66 making contact between switch arms 55 and 54.

Figure 3:
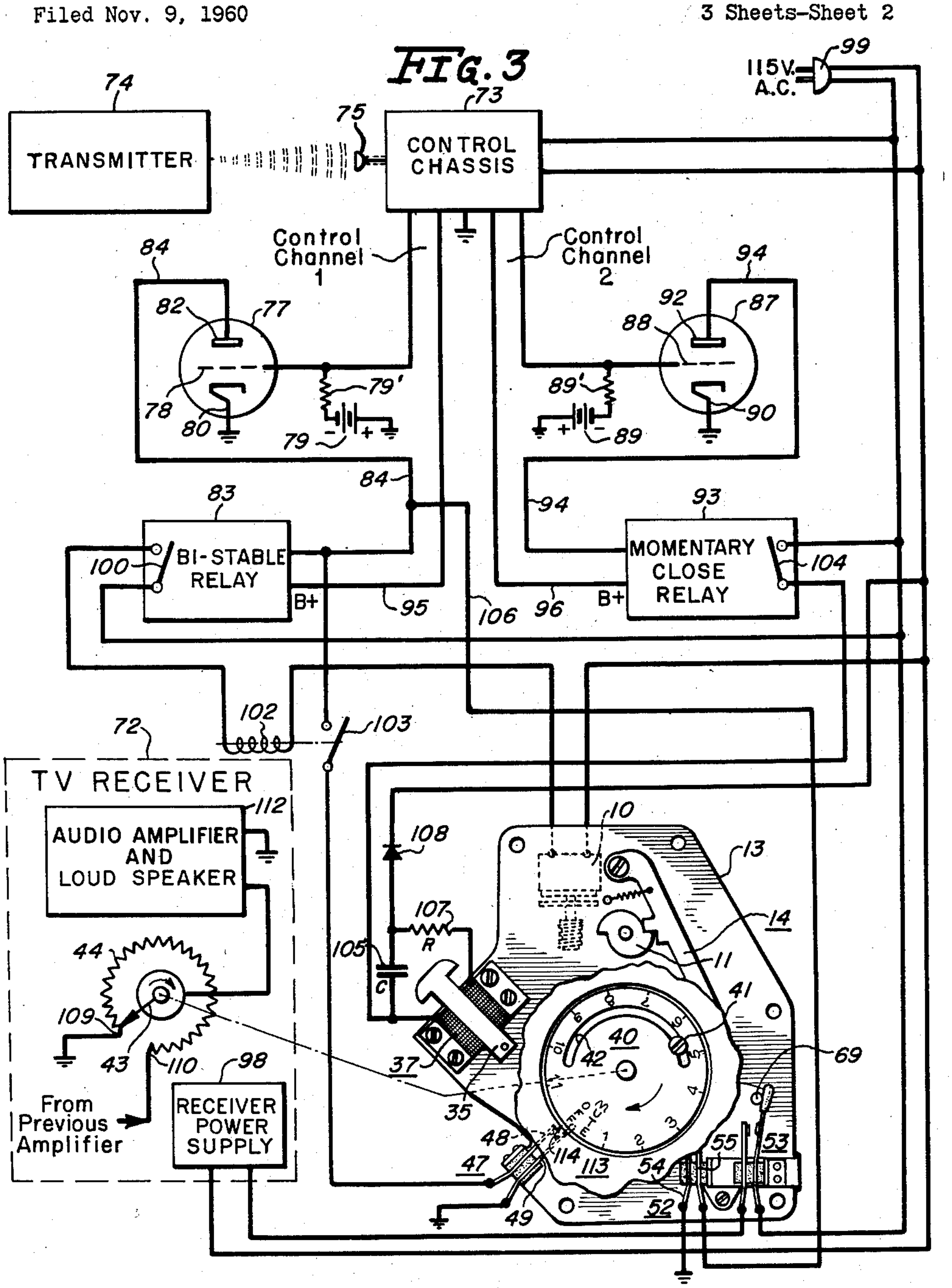
FIGURE 3 is a schematic diagram of a preferred embodiment of the invention.

Referring now to FIGURE 3, a conventional television receiver 72 adapted for remote volume control is shown as an example of a type of sound reproducing apparatus to which the present invention is particularly applicable. The switching device of FIGURE 1 is shown in its functional setting mounted on plate 13. The construction and operation of television receiver 72 may be entirely conventional except for the operation of the volume control which will be discussed below.

A control receiver 73 which detects remote control signals generated by an ultrasonic transmitter 74 includes a frequency-selective amplifier coupled to a microphone 75 for detecting ultrasonic control signals. Transmitter 74 may be of the type including longitudinal-mode vibrators such as aluminum rods and strikers which are operatively associated with each rod. When the user operates a striker, a rod is struck on its end and generates an ultrasonic control signal of a frequency determined by the physical length of the rod. By using several different rods of different lengths, remote control signals of several distinctively different frequencies may be selectively generated. In the illustrated embodiment of FIGURE 3, transmitter 74 selectively develops ultrasonic control signals of two distinctive frequencies. Individual control signals radiated by transmitter 74 are detected by control receiver 73 to develop control pulses on control channels 1 or 2, depending upon the frequency of the transmitted remote control signal. As thus far described, the remote control system may correspond to that described in U.S. Patent 2,817,025 granted to Robert Adler on December 17, 1957 and assigned to the same assignee as the present application.

Included in control channel 1 is a control tube 77 comprising a control grid 78 coupled to control receiver 73, a grounded cathode 80, and a plate or anode 82 which is connected by a lead 84 to the actuating element of a bi-stable relay 83. Grid 78 is shunted to ground through a biasing battery 79 connected in series with a resistor 79'. Similarly included in control channel 2 is a control tube 87 comprising a control grid 88 coupled to control receiver 73, a grounded cathode 90, and a plate or anode 92 which is connected by a lead 94 to the actuating element of a momentary-close relay 93. Grid 88 is shunted to ground through a biasing battery 89 connected in series with a resistor 89'. The actuating elements of both bi-stable relay 83 and momentary close-relay 93, and hence plates 82 and 92, are supplied B+ voltage from control receiver 73 by B+ leads 95 and 96 respectively.

A receiver power supply 98 of television receiver 72, as well as solenoid 37, driving motor 10, and control receiver 73 are all adapted to be energized from a conventional power plug 99. Switch 53 is in series with one of the energizing leads to receiver power supply 98, de-energizing the power supply when it is open and energizing the power supply when it is closed. The switch contacts 100 of bi-stable relay 83 are in series with the energizing circuit to driving motor 10 for energizing and de-energizing the motor; also in series is a solenoid 102 which when energized closes a normally open switch 103 connected in series with switch 47 to complete an alternate energizing circuit for bistable relay 83. The switch contacts 104 of momentary-close relay 93 are in series with the energizing circuit to solenoid 37, and the power supply leads to solenoid 37 also include a diode rectifier 108 and associated load circuit comprising resistance 107 and capacitor 105. When switch 104 is closed by actuation of relay 93, solenoid 37 is energized thus actuating plunger 35. However the opening of switch 104 does not immediately de-energize solenoid 37 since the energy stored in capacitor 105 is dissipated through solenoid 37 thus delaying the release of plunger 35 for a time determined by the time constant RC of load circuit 107, 105.

Switch arm 48 (shown in dashed outline) of switch 47 is connected to lead 84 through switch 103; switch arm 49 is grounded. Switch arm 55 of switch 52 is connected by a lead 106 to lead 84 while switch arm 54 is terminated on ground.

Printed resistance board 44' is shown in television receiver 72 as a rheostat type resistance 44 having one terminal 109 which is grounded and the other terminal 110 which is connected to a previous audio amplifier stage of television receiver 72. Switch arm 43 is connected to an audio amplifier and loudspeaker 112 and as shown in FIGURE 2 is coupled to ratchet wheel 18. As arm 43 is moved from terminal 109 to 110, the portion of the signal voltage from the previous audio amplifier being applied to audio amplifier and loudspeaker 112 is increased thereby producing a higher audio volume level.

Since disc 40 is coupled to volume control 43, 44, its rotational position is indicative of the audio volume level of television receiver 72. With switch arm 43 near terminal 109, the audio volume is muted or at a zero level and the position of the volume control is indicated on disc 40 by the "mute" designation; this occurs when "mute" is opposite an index mark 114 which is placed on a front portion 113 of television receiver 72. Higher levels of audio volume are indicated by the reference numbers 1–11, 11 being established opposite index mark 114 when switch arm 43 is near terminal 110 of resistance 44 for maximum volume.

In operation, it may be assumed that receiver power supply 98 of television receiver 72 is de-energized or "off." Receiver power supply 98 is de-energized when, referring to FIGURE 1, ratchet wheel 18 is rotated in a counter-clockwise direction until stud 21 engages projection 65, rotating plate 63 clockwise and causing stud 69 to move against tip portion 61 to disengage movable contact 60 from contact 59 and open the energizing circuit to receiver power supply 98. The counterclockwise torsional force of spring 22 retains stud 21 against extension 65. With ratchet wheel 18 in its "off" position, as indicated by the "off" designation on disc 40 of FIGURE 3 being located opposite index mark 114, switch arm 43 of volume control 43, 44 is in contact with ground terminal 109 of resistance 44.

When the user wishes to energize television receiver 72, he actuates transmitter 74 to produce a command signal of a frequency which causes control receiver 73 to develop a control pulse in control channel 1. The control pulse is positive and overcomes the negative bias of battery 79 causing control tube 77 to conduct, thereby grounding lead 84 and placing B+ across the actuating element of relay 83. Actuation of bi-stable relay 83 closes switch 100 which in turn energizes driving motor 10.

Referring to FIGURE 1, driving motor 10 rotates cam 11 clockwise, causing arm 17 to move ratchet wheel 18 in a clockwise direction. Since contact arm 43 (FIGURES 2 and 3) is also coupled to the same shaft as ratchet wheel 18, it also rotates in a clockwise direction, gradually increasing the signal voltage to audio amplifier and loudspeaker 112 thus increasing the audio volume level in a manner well known in the art. At the initiation of rotation of ratchet wheel 18, stud 21 is moved away from projection 65 allowing plate 63 to pivot in a counter-clockwise direction, being pivoted by the bending force of switch arm 60 and tip portion 61, thereby allowing switch 53 to return to its normally closed position and energizing receiver power supply 98. As ratchet arm 17 rotates ratchet wheel 18 in a clockwise direction against the bias of torsional spring 22, pawl 23 prevents any backward motion of the ratchet wheel.

Figures 4, 5, 6:
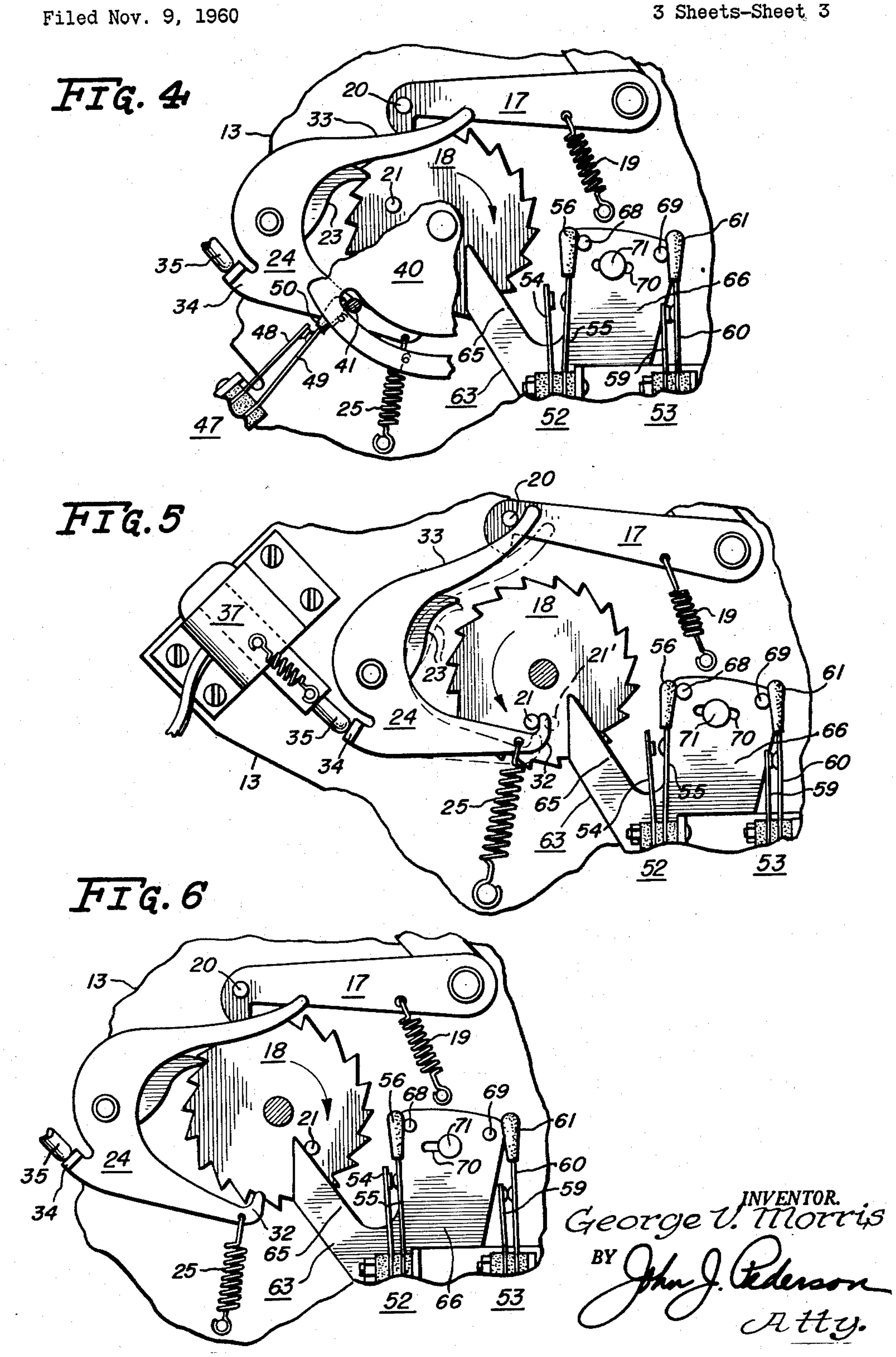
FIGURES 4, 5 and 6 are partial elevational views of FIGURE 1 useful in explaining the operation of the embodiment of FIGURE 3.

Ratchet wheel 18 continues to rotate clockwise until adjustable stud 41 engages tip portion 50 of switch 47 forcing switch arm 49 into contact with switch arm 48 as shown in FIGURE 4. Meanwhile, and referring back to FIGURE 3, the continued energization of motor 10 has energized solenoid 102 closing switch 103. While switch 103 is closed, the closing of switch 47 by stud 41 grounds lead 84 to actuate bi-stable relay 83. Switch 100 of relay 83 opens, de-energizing motor 10 and stopping the motion of ratchet wheel 18 at an intermediate audio volume level. Although stud 41 may still hold switch 47 in its closed condition, ground is removed from lead 84 by the opening of switch 103 since de-energization of motor 10 also de-energizes solenoid 102. Thus, by means of switch 103, bi-stable relay 83 is conditioned to operate into its closed position when lead 84 is again grounded.

The relative volume level of the intermediate position volume control 43, 44 is determined by the location of stud 41 in slot 42. As shown in FIGURE 3, stud 41 may be adjusted as desired within a relative volume range of 5 to 10. Thus, by adjusting adjustable stud 41 from level 5 through level 10, any intermediate volume position which is comfortable to the listener under normal listening conditions may be achieved. An advantage of this provision for preset intermediate volume level is that it automatically sets volume at a desired level for the listener and does this upon initial energization of television receiver 72; therefore when the user first turns on his set the first volume level he will hear is that of his selected intermediate position. A further increase in volume may be obtained from the intermediate position by again actuating transmitter 74 developing a command signal of a frequency to provide a control pulse in control channel 1, thus placing ground on lead 84 and closing switch 100 of bi-stable relay 83. The driving motor then continues to increase volume until the user again actuates transmitter 74 to develop a pulse in control channel 1, opening switch 100 and de-energizing the motor. The volume control stops at this position, being held there against the bias of torsion spring 22 by means of pawl 23.

If an annoying commercial appears on the television receiver or if the user's telephone rings, it may be desired to mute the receiver directly from any attained volume setting. To this end, means are provided for directly resetting volume control 43, 44 to its "mute" position. The user actuates transmitter 24 to generate a command signal of the proper frequency to develop a positive control pulse in control channel 2, thus overcoming the negative bias on grid 88 and allowing tube 87 to conduct; this grounds lead 94 and actuates momentary-close relay 93. When switch 104 closes, the energizing circuit to solenoid 37 is completed and solenoid 37 forces plunger 35 against bearing surface 34 as shown in FIGURE 5. The force of plunger 35 against bearing surface 34 rotates rocker arm 24 in a counter-clockwise direction producing three results: (1) extension 33 is forced against stud 20 of ratchet arm 17 pushing the ratchet away from the teeth of ratchet wheel 18; (2) rotation of rocker arm 24 also rotates pawl 23 away from the teeth of ratchet wheel 18 thereby allowing ratchet wheel 18 to rotate in a counter-clockwise direction under the force of helical spring 22; and (3) hook extension 32 is moved forward into a position as shown by the solid outline in FIGURE 5 so as to intercept stud 21 of ratchet wheel 18 and prevent further counter-clockwise rotation of ratchet wheel 18. Since it takes a finite amount of time for ratchet wheel 18 to rotate from its original position to the position where stud 21 is intercepted by extension 32, rocker 24 must remain in the position as shown in the solid outline in FIGURE 5 for a predetermined period of time. Since relay 93 is only a momentary-close relay and is only actuated a very short period of time, after switch 104 opens the RC time constant of load circuit 105, 107 keeps solenoid 37 energized at least as long as the maximum time required for ratchet wheel 18 to rotate until stud 21 is intercepted by extension 32. If plunger 35 were allowed to return to its normal position immediately after switch 104 opened, thus allowing rocker arm 24 to rotate in a clockwise direction under the influence of spring 25, both pawl 23 and ratchet 17 would prevent any further counter-clockwise movement of ratchet wheel 18 and therefore stop any further decrease in volume.

After stud 21 is intercepted by extension 32 of rocker arm 24, the discharge of condenser 105 continues until the plunger springs back to its normal position allowing spring 25 to pull rocker arm 24 in a clockwise direction. As rocker arm 24 begins to rotate, stud 21 is freed from the extension 32 as shown by the dashed line position of the rocker arm in FIGURE 5. At this point helical spring 22 starts to turn ratchet wheel 18 in a counter-clockwise direction. Some rotation of ratchet wheel 18 is accomplished since the release of stud 21 from extension 32 occurs before pawl 23 intercepts a tooth of the ratchet wheel. However continued rotation of rocker arm 24 causes pawl 23 to intercept a tooth of wheel 18 before stud 21 starts to engage projection 65, and stud 21 comes to rest in the position shown in dashed outline 21'. In this position of the ratchet wheel, where the stud is shown by 21', the volume level is reduced to zero and this condition is indicated in FIGURE 3 by "mute" of disc 40 being located opposite index 114.

The above means for directly resetting volume control 43, 44 to its "mute" position are independent of driving means or driving motor 10; rotation of rocker arm 24 in a counter-clockwise direction, disengaging ratchet arm 17 from contact with the teeth of ratchet wheel 18, allows driving motor 10 to continue to rotate, thus moving the ratchet arm in a reciprocating motion but having no effect on the ratchet wheel.

When volume is muted and ratchet wheel 18 rotates down to the "mute" position in a counter-clockwise direction, adjustable stud 41 on disc 40 momentarily engages tip portion 50 (see FIGURE 4) of switch 47 during the downward travel. However since switch 47 is normally open and this engagement just causes switch 47 to open further, bi-stable relay 83 to which switch 47 is connected is not affected.

Means for de-energizing at least a portion of television receiver 72 includes switch 53 which is in series with the energizing circuit to receiver power supply 98. Switch 53 is opened when the user again actuates transmitter 74 to develop a command signal of a frequency to produce a pulse in channel 2 to close momentary-close relay 93; this energizes solenoid 37 and rotates rocker arm 24 to allow free movement of wheel 18. Ratchet wheel 18 rotates until stud 21 engages projection 65 to rotate plate 66 so that stud 69 dis-engages switch arm 60 from contact with switch arm 59 and thereby de-energizes receiver power supply 98. Thus, control channel 2 performs two functions. Actuation of relay 93 while the volume is at some higher level than "mute" results in muting the volume; a second actuation of relay 95 while the volume control is established in the mute position de-energizes receiver power supply 98.

Assuming that the volume is at its intermediate level, with the mechanism in the condition shown in FIGURE 4, actuation of transmitter 74 to generate a command signal of the proper frequency to place ground on lead 84 closes switch 100 of bi-stable relay 83 to energize drive motor 10 and initiate volume increase. If the volume increase is not stopped by another actuation of the transmitter with consequent energization of bi-stable relay 83 to open switch 100, ratchet wheel 18 continues to rotate. However means are provided which are responsive to establishment of volume control 43, 44 in its maximum volume or terminal position with switch arm 43 contacting terminal 110 of resistance 44 for automatically de-energizing driving motor 10. Referring to FIGURE 6, as ratchet wheel 18 is rotated in a clockwise direction, stud 21 ultimately engages projection 65 when the volume reaches its maximum level. This rotates plate 66 in a counter-clockwise direction and moves stud 68 against tip portion 56 to close switch 52. With switch 52 closed, lead 84 is grounded as shown in FIGURE 3, thus energizing bi-stable relay 83 and opening switch 100 to de-energize motor 10. The volume then remains at the maximum level until the user mutes volume by actuating transmitter 24 to generate a command signal of the proper frequency to develop a control pulse in control channel 2, which results in closing of switch 104 of relay 93 and actuation of solenoid 37.

If desired, further provision may be made to automatically reset the volume control to its mute position in response to the establishment of volume in its terminal position as disclosed and claimed in the copending application of Howard C. Grossenheider, Serial No. 68,213, titled "Remote Control Apparatus" filed concurrently herewith.

Thus, in summary, switch 43, 44 is an adjustable volume control having a mute or reference position, an intermediate operating position, a terminal operating position and having a plurality of additional operating positions between the mute and terminal operating positions for selectively establishing a plurality of different audio output levels. Electrically operated driving means comprising driving motor 10 is coupled to the volume control 43, 44 for varying the control between its operating positions. Bi-stable relay 83 and control tube 77 are included in control channel 1 and are responsive to control pulses developed therein for energizing and de-energizing the driving motor 10 at will. Control tube 87 and relays 93 and solenoid 37 are included in control channel 2 and are responsive to control pulses developed therein for directly resetting volume control 43, 44 to its mute position from any other operating position.

Thus the invention provides an intelligence-reproducing apparatus, adapted for remote control, which requires the utilization of only two control channels to give control of "on-off," continuous or infinitely adjustable volume level, and instantaneous mute from any volume setting.

While a particular embodiment of the invention has been shown and described, it is apparent that modifications and alterations may be made without departing from the invention in its broader aspects and therefore, the aim of the appended claims is to cover all such modifications and alterations as fall within the true spirit and scope of the invention.

I claim:

1. Remote control apparatus comprising: a control device including an adjustable element having a reference position and a plurality of additional operating positions for controlling an operating characteristic of said apparatus; electrically operated driving means coupled to said control device for varying said adjustable element between said operating positions; control-signal-responsive means for energizing and de-energizing said driving means at will; means independent of said driving means for directly resetting said adjustable element to said reference position from any of said additional operating positions; and control-signal-responsive means for actuating said resetting means.

2. Remote control apparatus comprising: a control device including an adjustable element having a reference position and a plurality of additional operating positions for controlling an operating characteristic of said apparatus; control-signal-responsive means including first and second control channels in which control pulses are selectively developed in response to received control signals of predetermined first and second frequencies respectively; electrically operated driving means coupled to said control device for varying said adjustable element between said operating positions; means included in said first control channel and responsive to control pulses developed therein for energizing and de-energizing said driving means at will; and means, independent of said driving means, included in said second control channel and responsive to control pulses developed therein for directly resetting said adjustable element to said reference position from any of said additional operating positions.

3. Sound reproducing apparatus adapted for wireless remote control comprising: an adjustable volume control having a mute position and a plurality of additional operating positions for selectively establishing the audio output level of said sound reproducing apparatus at a plurality of different sound levels; electrically operated driving means coupled to said volume control for varying it between said operating positions; control-signal-responsive means for energizing and de-energizing said driving means at will; means independent of said driving means for directly resetting said volume control to said mute position from any of said additional operating positions; and control-signal-responsive means for actuating said resetting means.

4. Sound reproducing apparatus adapted for wireless remote control comprising: an adjustable volume control having a mute position for establishing the audio output level of said sound reproducing apparatus at a predetermined minimum, an intermediate operating position for establishing said output at a nominal listening level, and a plurality of additional operating positions for selectively establishing a plurality of different audio output levels; electrically operated driving means coupled to said volume control for varying it between said operating positions; control-signal-responsive means for energizing and de-energizing said driving means at will; means independent of said driving means for directly resetting said volume control to said mute position from any of said operating positions; control-signal-responsive means for actuating said resetting means; and means responsive to establishment of said volume control in said intermediate position by said driving means for de-energizing said driving means.

5. Sound reproducing apparatus according to claim 4 in which means are provided for adjusting said intermediate operating position.

6. Sound reproducing apparatus adapted for wireless remote control comprising: an adjustable volume control having a mute position for establishing the audio output level of said sound reproducing apparatus at a predetermined minimum, a terminal operating position for establishing said output at a predetermined maximum, and a plurality of additional operating positions between said mute position and said terminal operating position for selectively establishing a plurality of different audio output levels; electrically operated driving means coupled to said volume control for varying it between said operating positions; control-signal-responsive means for energizing and de-energizing said driving means at will; means independent of said driving means for directly resetting said volume control to said mute position from any of said operating positions; control-signal-responsive means for actuating said resetting means; and means responsive to establishment of said volume control in said terminal position for automatically de-energizing said driving means.

7. Sound reproducing apparatus adapted for wireless remote control comprising: an adjustable volume control having a mute position and a plurality of additional positions for selectively establishing the audio output level of said sound reproducing apparatus at a plurality of different audio output levels; electrically operated driving means coupled to said volume control for varying it between said operating positions; control-signal-responsive means for energizing and de-energizing said driving means at will; means independent of said driving means for directly resetting said volume control to said mute position from any of said additional operating positions; control-signal-responsive means for actuating said resetting means; means for de-energizing at least a portion of said apparatus; and means, conjointly responsive to control signals and to establishment of said volume control in said mute position, for actuating said de-energizing means.

8. Sound reproducing apparatus adapted for wireless remote control comprising: an adjustable volume control having a mute position for establishing the audio output level of said sound reproducing apparatus at a predetermined minimum, an intermediate operating position for establishing said output at a nominal listening level, a terminal operating position for establishing said output at a predetermined maximum, and a plurality of additional operating positions between said mute position and said terminal operating position for selectively establishing a plurality of different audio output levels; control-signal-responsive means including first and second control channels in which control pulses are selectively developed in response to received control signals of predetermined first and second frequencies respectively; electrically operated driving means coupled to said volume control for varying said control between said operating positions; means included in said first control channel and responsive to control pulses developed therein for energizing and de-energizing said driving means at will; means, independent of said driving means, included in said second control channel and responsive to control pulses developed therein for directly resetting said volume control to said mute position from any of said operating positions; means responsive to establishment of said volume control in said intermediate position by said driving means for de-energizing said driving means; means responsive to establishment of said volume control in said terminal position for de-energizing said driving means; means for de-energizing at least a portion of said apparatus; and means, included in said second control channel, and conjointly responsive to control pulses and to establishment of said volume control in said mute position, for actuating said de-energizing means.

9. Sound reproducing apparatus according to claim 8, in which means are provided for adjusting said intermediate operating position.

References Cited in the file of this patent

UNITED STATES PATENTS

| | | |
|---|---|---|
| 2,250,371 | Grimes | July 22, 1941 |
| 2,383,338 | Newman | Aug. 21, 1945 |
| 2,817,025 | Adler | Dec. 17, 1957 |
| 2,830,241 | Turck | Apr. 8, 1958 |
| 2,897,354 | Bourget et al. | July 28, 1959 |
| 2,923,918 | Adler | Feb. 2, 1960 |
| 2,947,812 | Parmet et al. | Apr. 2, 1960 |
| 2,994,063 | Gibson | July 25, 1961 |